(12) United States Patent
Armstrong et al.

(10) Patent No.: US 10,190,038 B2
(45) Date of Patent: Jan. 29, 2019

(54) METHOD OF USING SOPHOROLIPIDS IN WELL TREATMENT OPERATIONS

(71) Applicant: Baker Hughes Incorporated, Houston, TX (US)

(72) Inventors: Charles David Armstrong, Tomball, TX (US); Rupa Venugopal, Katy, TX (US); Qi Qu, Spring, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 645 days.

(21) Appl. No.: 14/685,150

(22) Filed: Apr. 13, 2015

(65) Prior Publication Data

US 2015/0300139 A1 Oct. 22, 2015

Related U.S. Application Data

(60) Provisional application No. 61/982,198, filed on Apr. 21, 2014.

(51) Int. Cl.
| | |
|---|---|
| *C09K 8/68* | (2006.01) |
| *E21B 43/26* | (2006.01) |
| *C09K 8/08* | (2006.01) |
| *C09K 8/60* | (2006.01) |
| *C09K 8/88* | (2006.01) |
| *C09K 8/90* | (2006.01) |

(52) U.S. Cl.
CPC ............ *C09K 8/68* (2013.01); *C09K 8/08* (2013.01); *C09K 8/602* (2013.01); *C09K 8/685* (2013.01); *C09K 8/887* (2013.01); *C09K 8/90* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 4,830,828 | A * | 5/1989 | Anderson | C09K 8/54 210/698 |
| 5,879,913 | A | 3/1999 | Marchal et al. | |
| 7,052,901 | B2 * | 5/2006 | Crews | C09K 8/605 435/262 |
| 8,530,206 | B2 * | 9/2013 | Develter | C12N 15/01 435/134 |
| 9,096,449 | B1 * | 8/2015 | Conway | C02F 3/341 |
| 9,683,164 | B2 * | 6/2017 | Gunawan | C09K 8/54 |
| 2004/0021479 | A1 | 10/2004 | Gross et al. | |

(Continued)

FOREIGN PATENT DOCUMENTS

| | | |
|---|---|---|
| EP | 1953237 A1 | 8/2008 |
| FR | 2855752 A1 | 12/2004 |

(Continued)

OTHER PUBLICATIONS

PetroWiki, "Fracturing Fluids and additives," retrieved Aug. 10, 2017 from http://petrowiki.org/Fracturing_fluids_and_additives.*

(Continued)

*Primary Examiner* — Angela M DiTrani Leff
(74) *Attorney, Agent, or Firm* — John Wilson Jones; Jones Delflache LLP

(57) ABSTRACT

Recovery of fluids from a subterranean formation during a well treatment operation is enhanced by injecting into the formation a treatment fluid comprising a sophorolipid.

5 Claims, 1 Drawing Sheet

(56) References Cited

U.S. PATENT DOCUMENTS

| | | | |
|---|---|---|---|
| 2004/0024250 A1 | 12/2004 | Gross et al. | |
| 2007/0078068 A1 | 4/2007 | Askew | |
| 2009/0018683 A1 | 7/2009 | Gross et al. | |
| 2009/0221455 A1 | 9/2009 | Ke et al. | |
| 2010/0030069 A1 | 12/2010 | Gray et al. | |
| 2013/0062053 A1* | 3/2013 | Kohr | C09K 8/582 166/246 |
| 2014/0305649 A1* | 10/2014 | Tang | C09K 8/70 166/308.2 |
| 2016/0003216 A1 | 2/2016 | Campbell et al. | |
| 2016/0237334 A1 | 8/2016 | Gunawan et al. | |
| 2016/0251565 A1* | 9/2016 | Yanagisawa | C09K 8/68 166/308.2 |
| 2017/0044586 A1* | 2/2017 | Duran | C12P 19/44 |
| 2017/0051197 A1* | 2/2017 | Duran | C09K 8/62 |

FOREIGN PATENT DOCUMENTS

| | | |
|---|---|---|
| WO | 2007073371 A1 | 6/2007 |
| WO | 2007130738 A1 | 11/2007 |
| WO | 2015164324 A1 | 10/2015 |
| WO | 20150164327 A1 | 10/2015 |

OTHER PUBLICATIONS

Ashby et ai, "The Influence of Increasing Media Methanol Concentration on Sophorolipid Biosynthesis", Biotechnology Letters, 2010, 32 (10), pp. 1429-1437 (Abstract only).

DeKoster, "Tandem Mass Spectrometry & NMR Spectroscopy Studies of Candida bombicola Sophorolipids", Analytical Biochemistry (1995), 230( 1), pp. 135-148 (Abstract Only).

Fleurackers, "On the Production and Identification of Medium-Chained Sophorolipids". Eur. Journal of Lipid Science & Technology (2010), 112(6), pp. 655-662 (Abstract Only).

Fu et ai, "Sophorolipids and their Derivatives are Lethal Against Human Pancreatic Cancer Cells," Journal of Surgical Resarch (2008), 148(1), pp. 78-82 (Abstract Only).

Imura et ai, "Enzymatic Conversion of Diacetylated Sophorolipid into Acetylated Glucoselipid", Journal of Oleo Science (2010),59(9), pp. 495-501 (Abstact Only).

Ratsep et ai, "Identification & Quantification of Sophorolipid Analogs", Journal of Microbiological Methods (2009), 78(3), pp. 354-356 (Abstract Only).

Shah, "Sophorolipids, Microbial Glycolipids with Anti-Human Immunodeficiency Virus & Sperm-Immo", Antimicrobial Agents & Chemotherapy (2005), 49(10), 4093-4100(Abstract Only).

U.S. Appl. No. 61/981,951, filed Apr. 21, 2014.

U.S. Appl. No. 61/981,964, filed Apr. 21, 2014.

* cited by examiner

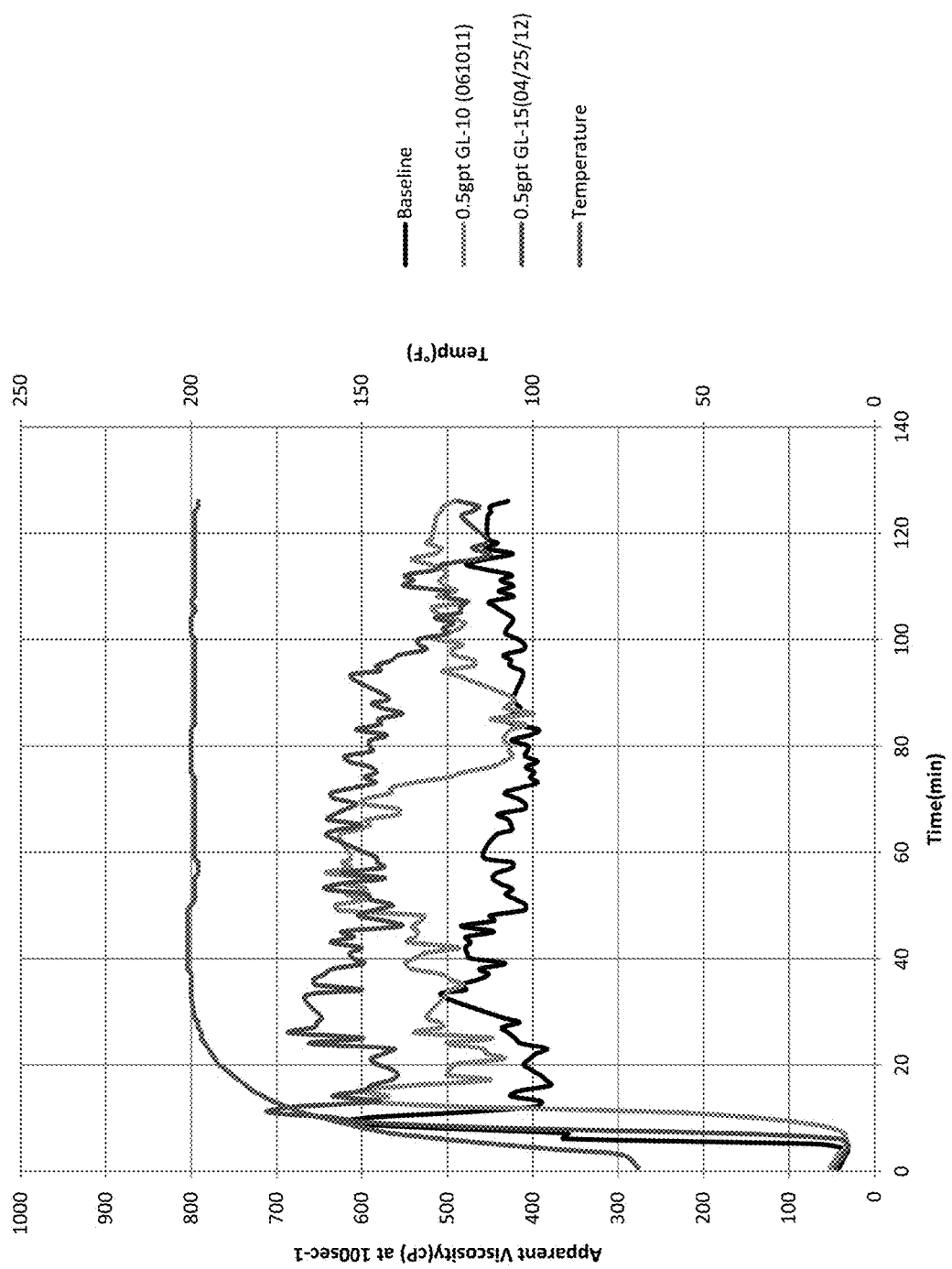

METHOD OF USING SOPHOROLIPIDS IN WELL TREATMENT OPERATIONS

This application claims the benefit of U.S. patent application Ser. No. 61/982,198, filed on Apr. 21, 2014.

FIELD OF THE INVENTION

The invention relates to a method of enhancing the recovery of fluids from a subterranean formation during a well treatment operation by injecting into the formation a treatment fluid comprising a sophorolipid.

BACKGROUND OF THE INVENTION

Hydrocarbons are obtained from subterranean formations by drilling through a well that penetrates the formation. This provides a partial flow-path for the hydrocarbons to reach the surface. In order for the hydrocarbons to be produced, there must be a sufficiently unimpeded flowpath from the formation to the wellbore to be pumped to the surface. Some wells need to be stimulated due to insufficient porosity or permeability of the formation. Common stimulation techniques include hydraulic fracturing and acidizing operations. The efficiency in hydrocarbon recovery from such stimulation techniques is dependent on the development of sufficient channels for the flow of hydrocarbons from low permeability regions of the formation.

During hydraulic fracturing, a fracturing fluid, typically a gelled or thickened aqueous solution containing proppant is injected into the wellbore under high pressure and injection rates. Once natural reservoir pressures are exceeded, the fluid induces a fracture in the formation and transports the proppant into the fracture. The fracture generally continues to grow during pumping and the proppant remains in the fracture in the form of a permeable pack that serves to "prop" the fracture open. The fractures radiate outwardly from the wellbore and extend the surface area from which oil or gas drains into the well. The proppant pack forms a highly conductive pathway for hydrocarbons and/or other formation fluids to flow into the wellbore.

An efficient fracturing fluid should possess good proppant transport characteristics. Such characteristics are dependent on the viscosity of the fluid. Generally, the viscosity should be high in order to achieve wider and larger fractures. High viscosity is further generally desirable for more efficient transport of proppant into the fractured formation. The fracturing fluid therefore typically contains a viscosifying agent, such as a viscoelastic surfactant or a polymer. The polymer may be linear or crosslinked. In certain formations, aqueous acid solutions can be used to improve the permeability of the formation, thereby increasing hydrocarbon production. These acids are often combined with polymeric gels to provide an acid fracturing fluid.

A wide range of additives may be used to enhance the rheological properties and/or the chemical properties of the fluid. Such additives include viscosifiers, friction reducing agents, surface active agents and fluid loss control additives.

After the fracturing fluid is injected into the formation and fractures have been established, production of hydrocarbons is enhanced through the new fractures by removal of the viscous fluid. Generally, the viscosity of the fluid may be decreased by introducing breakers into the formation which degrade the polymer or break the emulsion. However, breakers often result in incomplete breaking of the fluid and/or premature breaking of the fluid before the fracturing process is complete.

Similar to stimulation fluids, other fluids used to treat wells must be removed following the completion of the treatment operation for which such fluids are used. For instance, polymeric viscosifying agents frequently used in drilling muds and well completion fluids have a damaging effect since they tend to interfere with other phases of drilling and/or completion operations, as well as production of the well after such operations are finished. For example, drilling fluids tend to seep into the surrounding formation forming a filter cake on the wall of the wellbore. The filter cake sometimes can prevent casing cement from properly bonding to the wall of the wellbore. It is important in such operations that the viscosifying agents and other components of the drilling mud be removed from the well in order to enhance the recovery of hydrocarbons. Oxidative breakers and enzymes are often used to degrade the polysaccharide-containing filter cakes and residual damaging materials which reduce their viscosity.

As an alternative to the use of breakers, or for use in conjunction with breakers, flowback additives are often introduced into the well to assist in the removal of well treatment fluids. Flowback additives are typically surfactants. Such surfactants reduce the surface tension between the treatment fluid and hydrocarbons. For instance, in the recovery of hydrocarbon gases, flowback additives enable the recovery of more fluid which restores the formation's relative permeability to gas. In addition to fracturing and acidizing operations, there is a need for such flowback additives for use in other treatment operations, such as sand control operations.

While conventional surfactants have been widely used as flowback additives for the removal of treatment fluids from the formation and well, such surfactants are not environmentally friendly. The need exists for alternative flowback additives which are biodegradable, non-toxic, and biocompatible and which are based on renewable resources.

SUMMARY OF THE INVENTION

The invention relates to a method of enhancing the recovery of fluids from a subterranean formation during a well treatment operation by injecting into the formation a treatment fluid comprising a sophorolipid.

In an embodiment, the sophorolipid may be a mixture of sophorolipidic compounds of the formulas (I) and (II):

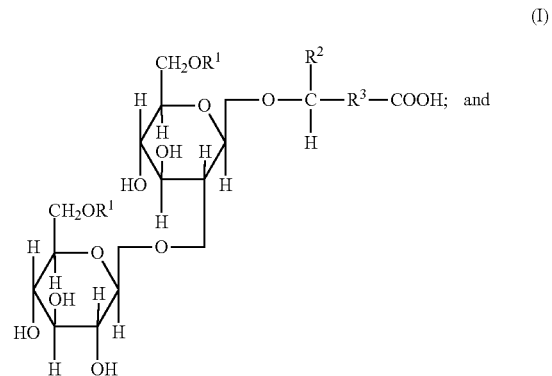

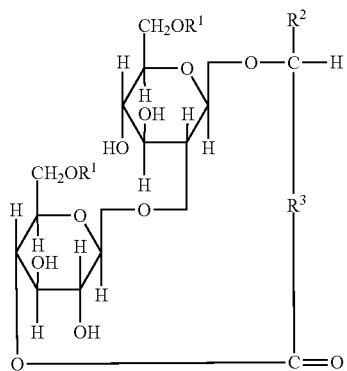

(II)

wherein $R^1$ is hydrogen or an acetyl group; and either (i) $R^2$ is hydrogen or a $C_1$-$C_9$ saturated or unsaturated aliphatic group; and $R^3$ is a $C_7$-$C_{16}$ saturated or unsaturated aliphatic group; or (ii) $R^2$ is hydrogen or a methyl group and $R^3$ is a saturated or unsaturated hydrocarbon chain that contains from 12 to 18 carbon atoms.

In one embodiment, the sophorolipid is a mixture of sophorolipidic compounds of the formulas (I) and (II) wherein $R^2$ is hydrogen or methyl.

In another embodiment, the sophorolipid is a mixture of sophorolipidic compounds of the formulas (I) and (II) wherein $R^2$ is either hydrogen or methyl and $R^3$ is an unsaturated hydrocarbon chain that contains from 12 to 18 carbon atoms.

In an embodiment, the sophorolipids may be a mixture of acidic-form sophorolipids of formula (Ia), where the sophorolipids may be in the free acid form (—$R^3$—COOH); or acidic-form sophorolipids of formula (Ib), where the acidic-form sophorolipids may be in the neutralized form, as a salt or as a sophorolipid anion (as illustrated in formula (Ib) below) and associated cations (i.e. $NH_4^+$, $Na^+$, $K^+$, $Ca^{2+}$, $Mn^{2+}$, or $Fe^{3+}$, (typically $Na^+$ or $K^+$ that are distributed in the sophorolipid containing composition and n is 1, 2, or 3.

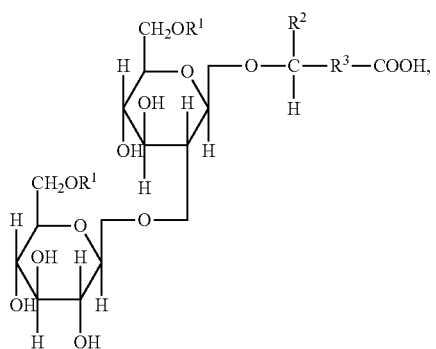

(Ia)

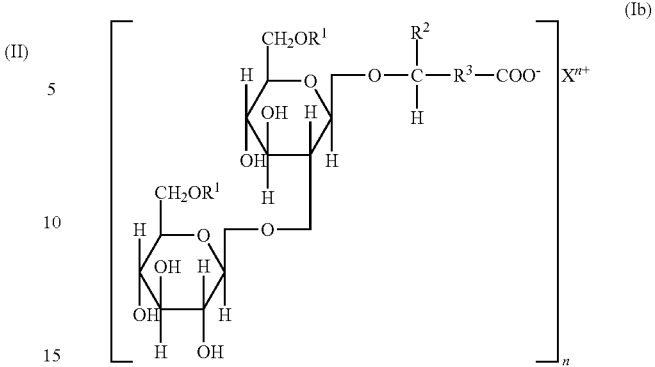

(Ib)

and ester-form sophorolipids of formulas either (IIa) or (IIb), or mixtures of (IIa) and (IIb), where these ester-form sophorolipids may be in the closed-ring form that may also be referred to as lactonic sophorolipids, or where the sophorolipids are in the open-ring form but the carboxyl acid moiety is esterified with, for example, a suitable alcohol or other hydroxyl-containing compound (—$R^3$—COOR$^4$, as an ester),

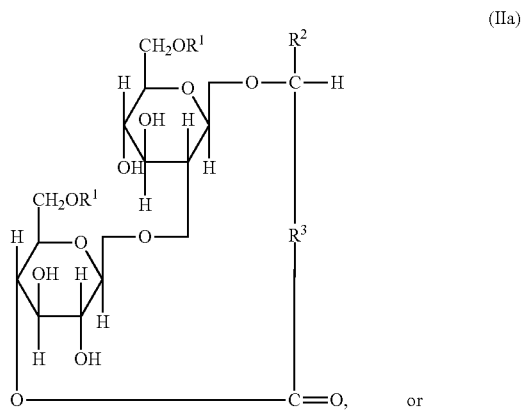

(IIa)

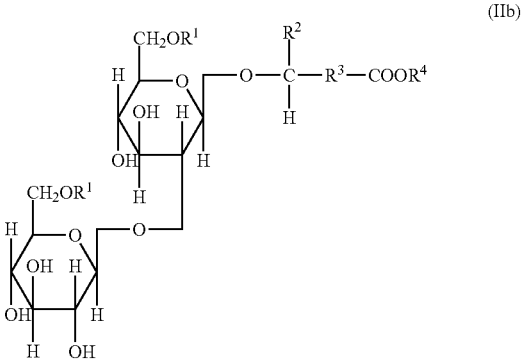

(IIb)

wherein $R^1$ is hydrogen, a $C_1$ to $C_4$ hydrocarbon or carboxylic acid group (typically an acetyl group); and either (i) $R^2$ is hydrogen or a $C_1$-$C_9$ saturated or unsaturated aliphatic group; and $R^3$ is a $C_7$-$C_{20}$ saturated or unsaturated aliphatic group; or (ii) $R^2$ is hydrogen or a methyl group and $R^3$ is a saturated or unsaturated hydrocarbon chain that contains from 7 to 20 carbon atoms. Typically $R^2$ is a hydrogen or methyl or ethyl group, (preferably a methyl group or hydrogen). Typically $R^3$ is $C_7$ to $C_{20}$ saturated or unsaturated aliphatic group a $C_7$ to $C_{20}$ (preferred is $C_{15}$ monounsaturated), and $R^4$ is hydrogen, $C_1$-$C_9$ saturated or unsaturated aliphatic group, monohydroxyl aliphatic group, or polyhydroxyl aliphatic group (preferred is hydrogen group).

In one embodiment, the sophorolipid is a mixture of sophorolipid compounds of the formulas (Ia) and (IIa) wherein $R^2$ is hydrogen or a $C_1$ to $C_4$ hydrocarbon (typically methyl).

In another embodiment, the sophorolipid is a mixture of acidic-form sophorolipids where at least portion of the acid moiety is neutralized with a base to form a salt or where the sophorolipid anion and associated cations of formula (Ib), as described above, are distributed in the sophorolipid containing composition, and ester-form sophorolipids as described in formulas (IIa) and (IIb). In yet another embodiment, all or any combination of the forms of the above describe sophorolipids may be in the composition.

In an embodiment, the sophorolipid used in the well treatment fluid is greater than 90% pure.

In another embodiment, the sophorolipid used in the well treatment fluid is greater than 95% pure.

In an embodiment, the treatment fluid containing the sophorolipid is used in a hydraulic fracturing well treatment operation.

In another embodiment, the treatment fluid containing the sophorolipid is used in a drilling operation.

In another embodiment, the treatment fluid containing the sophorolipid is used in a sand control operation.

BRIEF DESCRIPTION OF THE DRAWINGS

In order to more fully understand the drawings referred to in the detailed description of the present invention, a brief description of each drawing is presented, in which:

FIG. 1 illustrates the compatibility of a sophorolipids in guar based well treatment fluids.

DETAILED DESCRIPTION OF THE PREFERRED EMBODIMENTS

A sophorolipid may be incorporated into a well treatment fluid. The sophorolipid is particularly useful as a flowback additive to enhance the recovery of fluids used in well treatment operations.

Sophorolipids may be manufactured from corn (or other grain-based media) and vegetable oil with variations in the process being dependent on the natural and non-pathogenic yeast strand and production medium. As such, sophorolipids are naturally occurring bio-surfactant glycolipids produced from yeasts. For instance, the sophorolipids are glycolipids produced fermentatively from such yeasts as *Candida bombicola, Candida apicola,* and *Wickerhamiella domercqiae.* Sophorolipids are generally composed of a dimeric sophorose sugar moiety (β-D-Glc-(1→2)-D-Glc) linked glycosidically to a hydroxyl fatty acid residue. In a preferred embodiment, a sophorose sugar moiety is linked via the glycosidic linkage to the hydroxyl group of a 17-hydroxy-$C_{18}$ saturated or monoenoic (cis-9) fatty acid.

Depending on the pH of the system, sophorolipids can assume a circular, lactonic sophorolipid form or a linear, acidic sophorolipid form. Usually the 6-hydroxyl groups of the glucose moieties are acetylated. Depending upon the organism and the fermentation conditions used to produce the sophorolipid, the acidic or lactone form may predominate.

Suitable sophorolipids for use in the disclosure are those set forth in U.S. patent application Ser. No. 61/981,951, filed on Apr. 21, 2014 and U.S. patent application Ser. No. 61/981,964, filed on Apr. 21, 2014, both of which are herein incorporated by reference in their entirety.

In a preferred embodiment, the sophorolipid is a mixture of sophorolipidic compounds represented by the formulas (I) and (II):

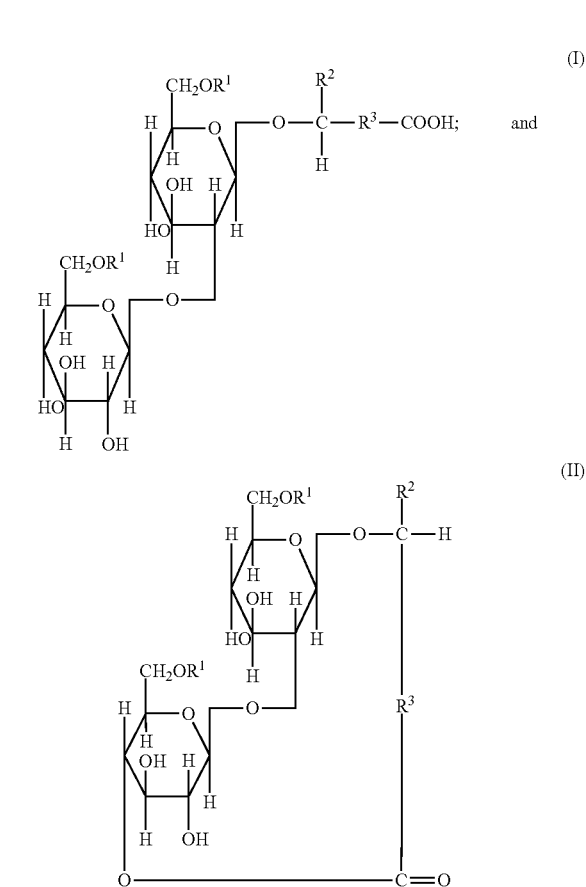

wherein $R^1$ is hydrogen or an acetyl group; and either $R^2$ is hydrogen or a $C_1$-$C_9$ saturated or unsaturated aliphatic group; and $R^3$ is a $C_7$-$C_{16}$ saturated or unsaturated aliphatic group; or $R^2$ is hydrogen or methyl and $R^3$ is a saturated or unsaturated hydrocarbon chain that contains from 12 to 18 carbon atoms, more preferably from about 13 to about 17 carbon atoms.

As illustrated, the hydroxyl fatty acid moiety of the acidic sophorolipids may remain a free acid (I) or form a macrocyclic lactone ring with the 4"-OH group of the sophorose lactone form (II). Such sophorolipidic compounds may be prepared by conventional methods known in the art, such as those disclosed in U.S. Pat. No. 5,879,913, herein incorporated by reference.

In an embodiment, the sophorolipid is a mixture of sophorolipidic compounds of the formulas (III) and (IV):

(III)

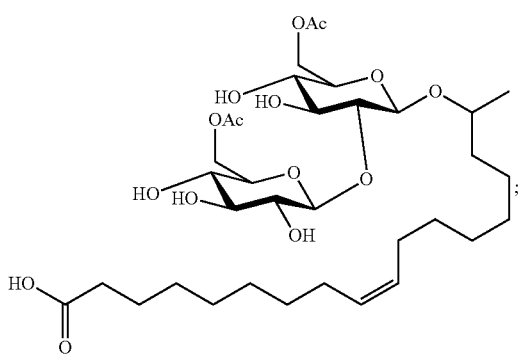

; and (IV)

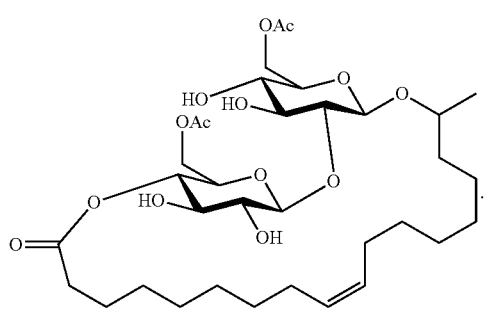

As described above, the sophorolipids may be a mixture of acidic-form sophorolipids of formula (Ia), where the sophorolipids may be in the free acid form (—R³—COOH); or acidic-form sophorolipids of formula (Ib), where the acidic-form sophorolipids may be in the neutralized form, as a salt or as a sophorolipid anion (as illustrated in formula (Ib) below) and associated cations (i.e. $NH_4^+$, $Na^+$, $K^+$ $Ca^{2+}$, $Mn^{2+}$, or $Fe^{3+}$, typically $Na^+$ or $K^+$) that are distributed in the sophorolipid containing composition and n is 1, 2, or 3.

(Ia)

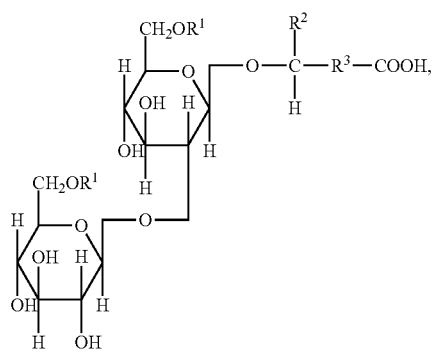

(Ib)

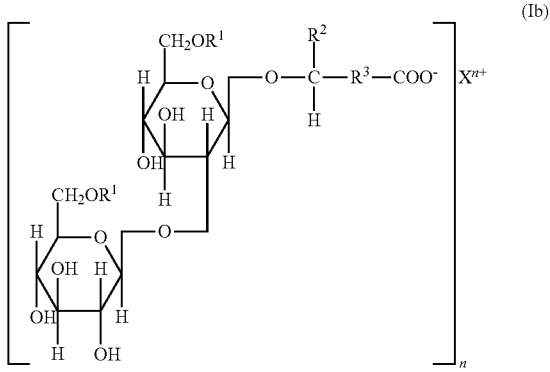

and ester-form sophorolipids of formulas either (IIa) or (IIb), or mixtures of (IIa) and (IIb), where these ester-form sophorolipids may be in the closed-ring form that may also be referred to as ester sophorolipids, or where the sophorolipids are in the open-ring form but the carboxyl acid moiety is esterified with, for example, a suitable alcohol or other hydroxyl-containing compound (—R³—COOR⁴, as an ester), (IIa)

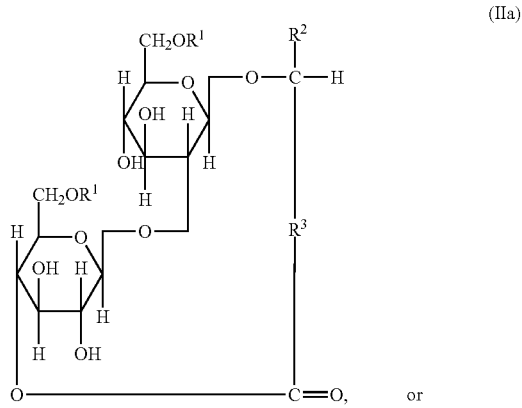

or (IIb)

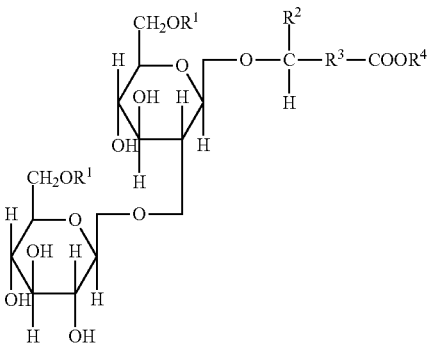

wherein $R^1$ is hydrogen, a $C_1$ to $C_4$ hydrocarbon or carboxylic acid group (typically an acetyl group); and either (i) $R^2$ is hydrogen or a $C_1$-$C_9$ saturated or unsaturated aliphatic group; and $R^3$ is a $C_7$-$C_{20}$ saturated or unsaturated aliphatic group; or (ii) $R^2$ is hydrogen or a methyl group and $R^3$ is a saturated or unsaturated hydrocarbon chain that contains from 7 to 20 carbon atoms. Typically $R^2$ is a hydrogen or methyl or ethyl group, (preferably a methyl group or hydrogen). Typically $R^3$ is $C_7$ to $C_{20}$ saturated or unsaturated aliphatic group a $C_7$ to $C_{20}$ (preferred is $C_{15}$ monounsaturated), and $R^4$ is hydrogen, $C_1$-$C_9$ saturated or unsaturated aliphatic group, monohydroxyl aliphatic group, or polyhydroxyl aliphatic group (preferred is hydrogen group). In one embodiment, the sophorolipid is a mixture of sophorolipids compounds of the formulas (Ia), (Ib), (IIa), and/or (IIb) wherein $R^2$ is hydrogen or methyl.

In another embodiment, the sophorolipid is a mixture of acidic-form sophorolipids where the acid moiety is at least partially neutralized with a base to form a salt or anion and cation distributed in the sophorolipid containing composition as described above, and ester-form sophorolipids where the carboxylic moiety is a lactone or an open chain ester-form sophorolipid (i.e. where the lactone ring is in open form but the acid moiety is esterified with a suitable hydroxyl containing compound such as, for example, glycerol or some other hydroxyl containing compound, such as mono- and poly-alcohols), or mixtures thereof. In yet another embodiment, all or any combination of the above describe sophorolipids may be in the composition.

Typically, the pH of the well treatment fluid containing the sophorolipid is from about 7.0 to about 13.0, more typically from about 8.5 to about 10.5.

The dry solids of materials made from such processes is typically greater than about 90%, more typically greater than about 95%, sophorolipid. Typically, there are some free fatty acids (preferably no greater than 5%) and a small amount of vegetable oil in the reaction product.

The sophorolipids described herein have particular applicability as flowback additives in a well treatment operation. As flowback additives, the sophorolipids function as biosurfactants in reducing the surface tension between the treatment fluid containing the sophorolipid and the produced hydrocarbons. This enables the recovery of more fluid from the formation and enhances or restores the formation's relative permeability to hydrocarbons.

In addition to being biodegradable, the sophorolipid biosurfactants are non-toxic, biocompatible and are made from renewable resources. The use of sophorolipid biosurfactants in well treatment fluids provides a green alternative to treatment fluids containing conventional flowback surfactants. In well treatment operations, such as hydraulic fracturing, which present environmental concerns, sophorolipid biosurfactants provide an attractive alternative to conventional synthetic surfactants. They further maximize the benefits of a fracturing operation by improving the recovery of the treatment fluid introduced into the formation.

The treatment fluid containing the sophorolipid may be fresh water, salt water, brine or may further be non-aqueous, such as methanol, ethylene glycol, etc. The fluid may further be a foamed fluid especially where it is desired to be used for deeper proppant penetration or in water sensitive zones.

While the sophorolipid may be a component of a well treatment fluid and pumped into the wellbore during a well treatment operation, a fluid containing the sophorolipid may also be pumped into the wellbore prior to or subsequent of such treatment operation. For example, during a well treatment operation (such as a drilling, stimulation or gravel packing operation), a fluid which is later desired to be recovered (a "recoverable fluid") may be pumped into the wellbore. This fluid may be, for instance, a fracturing fluid, a matrix stimulation fluid, an acidizing fluid, a hydrocarbon-based treatment fluid, a drilling mud, a drill-in fluid, a workover fluid, a packer fluid or a completion fluid. The sophorolipid may be a component of the recoverable fluid.

Alternatively, a precursor fluid may be pumped into the wellbore prior to the recoverable fluid. This precursor fluid may contain the sophorolipid. As an example, a spearhead fluid containing the sophorolipid may be pumped into the wellbore prior to the pumping of the fracturing fluid.

In another alternative, a post fluid may be pumped into the wellbore subsequent to the pumping of the recoverable fluid. This post fluid may contain the sophorolipid. As an example, a diverter fluid may be pumped into the wellbore subsequent to the pumping of the fracturing fluid. The diverter fluid may contain the sophorolipid.

In an embodiment, the sophorolipid may be a component of a fluid containing a viscosifying agent. The viscosifying agent may be a synthetic or natural polymer as well as a viscoelastic surfactant.

The synthetic or natural polymer may contain one or more functional groups, such as a hydroxyl, carboxyl, sulfate, sulfonate, amino or amido group. Preferred synthetic and natural polymers include polysaccharides and derivatives thereof, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Suitable polysaccharides and derivatives include those which contain one or more monosaccharide units of galactose, fructose, mannose, glucoside, glucose, xylose, arabinose, glucuronic acid and pyranosyl sulfate. These include non-derivatized and derivatized guar gums, locust bean gum, tara, xanthan, succinoglycan, scleroglucan and carrageenan. These polysaccharides include guar gums and derivatives, starches and galactomannan gums. In a preferred embodiment, guar gum may be underivatized guar or a derivatized guar, such as a hydroxyalkyl guar (like hydroxypropyl guar), a carboxyalkyl guar (like carboxymethyl guar) and a carboxyalkylhydroxyalkyl guar like carboxymethylhydroxypropyl).

Further, the polysaccharide may be a cellulose or cellulose derivative such as an alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

When the viscosifying agent is polymeric, the fluid may further contain a crosslinking agent. Suitable crosslinking agents include borate ion releasing compounds, organometallic or organic complexed metal ions comprising at least one transition metal or alkaline earth metal ion as well as mixtures thereof.

Borate ion releasing compounds which can be employed include, for example, any boron compound which will supply borate ions in the fluid upon disassociation from the deformable core. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable core. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy) bistriethanol aminate, titanium isopropoxyoctylene glycolate, titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. No. 4,514,309 and U.S. Pat. No. 5,247,995, which are incorporated herein by reference.

Further, the viscoelastic surfactant may be any viscoelastic surfactant known in the art. Preferred are those viscoelastic surfactants containing an anionic surfactant and a cationic surfactant. A most preferred viscoelastic surfactant is the combination of sodium xylene sulfonate, as anionic surfactant, and N,N,N-trimethyl-1-octadecammonium chloride, as cationic surfactant. Such viscoelastic surfactants are set forth in U.S. Pat. No. 6,468,945, herein incorporated by reference. The volume ratio of anionic surfactant:cationic surfactant is from about 1:4 to about 4:1.

Other preferred viscoelastic surfactants are those which contain a $C_{10}$ to $C_{24}$ alkyl trialkyl quaternary ammonium aromatic salt admixed with an anionic surfactant, such as sodium xylene sulfonate. Such systems include those set forth in U.S. Patent Publication No. 20040138071, herein incorporated by reference. Typically, the volume ratio of cationic surfactant:anionic surfactant of such viscoelastic surfactants is between from about 1:1 to about 3:1. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a gelled $C_{18}$ trimethyl quaternary ammonium phthalate or a gelled $C_{18}$ trimethyl quaternary ammonium salicylate. Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid.

The fluid containing the sophorolipid may further contain a breaker for defragmenting the viscosifying polymer and reducing the viscosity of the treatment fluid. Suitable are enzymatic and oxidative delayed breakers. Examples of suitable materials include, but are not limited to, amines, acids, acid salts, acid-producing materials, etc. The breaker is preferably an acid breaker such as hydrochloric acid, formic acid or sulfamic acid or alternatively a basic breaker such as sodium bisulfate. The oxidizing agent is preferably an alkaline earth peroxide, an encapsulated persulfate, a catalyzed organic peroxide or a hydrochlorite bleach.

In a preferred embodiment, the sophorolipid is used as flowback additive in a drilling fluid to enhance the recovery of the fluid having suspended solids and cuttings out of the wellbore. Such fluids, in addition to the viscosifying agent, typically may contain weighting agents.

In another preferred embodiment, the sophorolipid is used as a flowback additive in a hydraulic fracturing or a sand control operation.

In a preferred embodiment, the sophorolipids may be used in slickwater fracturing, a type of hydraulic fracturing that uses a low viscosity aqueous fluid to induce the subterranean fracture. The fluid containing the sophorolipid for use in slickwater fracturing typically has a viscosity only slightly higher than unadulterated fresh water or brine and typically contains a friction reduction agent. The fluid may further contain a non-crosslinked or linear gel. Typically, the friction reduction agent present in slickwater does not increase the viscosity of the fracturing fluid by more than 1 to 2 centipoises (cP). The slickwater fluid may be crosslinked or may consist of a linear viscosifying agent.

The sand control method may use the well treatment fluid in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

A fracturing fluid containing a sophorolipid may further contain a proppant. Such proppants include conventional proppants such as sand, glass beads, walnut hulls, and metal shot as well as resin-coated sands, intermediate strength ceramics, and sintered bauxite as well ultra lightweight proppants (ULW) having an apparent specific gravity less than or equal to 2.45. Such proppant include those disclosed in U.S. Pat. Nos. 6,364,018, 6,330,916; 6,059,034; 7,426,961; 7,322,411; 7,528,096; and 7,931,087, herein incorporated by reference.

The fluid may further contain one or more well treatment agents such as corrosion inhibitors, surfactants, biocides, surface tension reduction agents, friction reducers, scale inhibitors, clay stabilizers and iron control agents.

The sophorolipid may be combined with the other components of the fluid in a batch process performed at the wellsite using mixing vessels or may be batched mixed away from the wellsite and transported to the wellsite. In a preferred embodiment, the fluid containing the sophorolipid is prepared on the fly using continuous mixing methods at the wellsite.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

Fluid recovery was used to check the initial response of a sophorolipid biosurfactant by packing a column with 20/40

Ottawa sand. Nitrogen gas pressure was used to simulate production and flowed at a controlled rate to recover the fluid from the column. A flow meter was calibrated to get the desired flow rate of the fluid to be 8 cc/sec at 20 psi. The biosurfactant was tested at 1 gallon per one thousand gallons of tap water (gpt) and 2% KCl. The biosurfactant was also tested at 0.5 gpt in tap water at a pH of 5.0 and 11.0. The recovered amount of fluid from the column was captured and divided by the initial, known volume and a percent recovered volume calculated. Base fluid recovery without addition of surfactants gave fluid recovery below 60%. The results are set forth in Table I wherein Biosurfactant A is a sophorolipid comprising a mixture of formulas (III) and (IV). Biosurfactant B is a 50:50 v/v mixture of Biosurfactant A and ethylene glycol (as winterizing agent).

TABLE I

| Base Fluid-Tap water | Base fluid-2% KCl | Product | 1 gpt, water | 1 gpt, 2% KCl | 0.5 gpt, water | 0.5 gpt, water pH of 5.0 | 0.5 gpt, water, pH of 11.0 |
|---|---|---|---|---|---|---|---|
| 54.2% | 54.6% | A | 87.0% | 84.4% | 85.9% | 86.0% | 89.0% |
|  |  | B | 87.1% | 77.6% | 87.8% | 84.4% | 89.5% |

Table 1 demonstrates that as little as 0.5 gpt of a 1% solution of Biosurfactant A and Biosurfactant B produces a favorable recovery of base fluid.

Fluid recovery was then tested on two non-lipid synthetic fluid loss recovery additives, commercially available from Baker Hughes Incorporated. The results are shown in Table II and illustrate that the biosophorolipid additives exhibit the approximate percent fluid loss recovery as non-lipid additives.

TABLE II

| Product | 1 gpt, water | 1 gpt, 2% KCl |
|---|---|---|
| C | 88.5% | 87.0% |
| D | 88.6% | 86.3% |

Example 2

Into 1 l of water was added, with vigorous stirring, 6.25 gpt of an underivatized guar having an intrinsic viscosity of about 16.3 dl/g, 1.5 gpt of a borate crosslinker, commercially available as XLW-30 from Baker Hughes Incorporated, and 1.5 gpt of a potassium containing buffer capable of adjusting the pH of the fluid to a range of about 11.0, commercially available as BF-9L from Baker Hughes Incorporated. After gelation, the compatibility of two sophorolipids containing compounds of formulas (III) and (IV) with a 25 ppt of the guar based fluid was rheologically tested on a Fann 50 viscometer. The crosslinked fluid was tested at a constant shear rate of 100 sec$^{-1}$ with a shear rate ramp of 100, 80, 60, 40 sec$^{-1}$ at 75° F. initially and then every 30 minutes at 200° F. for 3 hours. The Fann 50 bath was pre-heated to a 200° F. The results, set forth in FIG. 1, demonstrate the compatibility of the biosurfactants with the guar based fluid.

From the foregoing, it will be observed that numerous variations and modifications may be effected without departing from the true spirit and scope of the novel concepts of the invention.

What is claimed is:

1. A method of enhancing recovery of a well treatment fluid from a well after subjecting the well to a well treatment operation with the well treatment fluid, the method comprising pumping into the well the well treatment fluid and then, after completion of the well treatment operation, recovering the well treatment fluid from the well, the well treatment fluid comprising at least one sophorolipidic compound selected from the group consisting of:

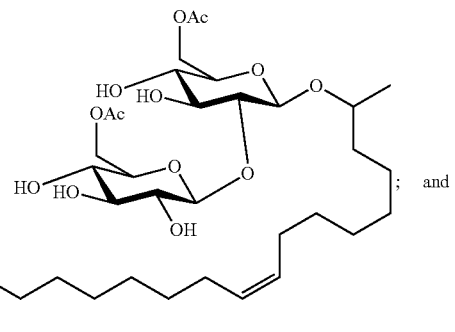

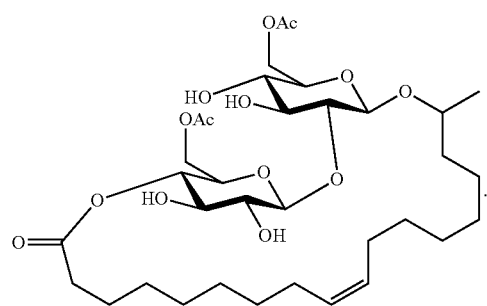

2. The method of claim 1, wherein (III) and (IV) are in equilibrium with each other.

3. The method of claim 1, wherein the well treatment fluid is introduced into the well during a drilling, stimulating or gravel packing operation.

4. The method of claim 1, wherein the well treatment fluid is introduced into the well during an acidizing or completion operation.

5. The method of claim 1, where in the well treatment operation is a stimulating, gravel packing or drilling operation.

* * * * *